Feb. 13, 1934.  L. A. UMANSKY  1,947,399
LENGTH MEASURING INDICATOR
Filed Oct. 30, 1930
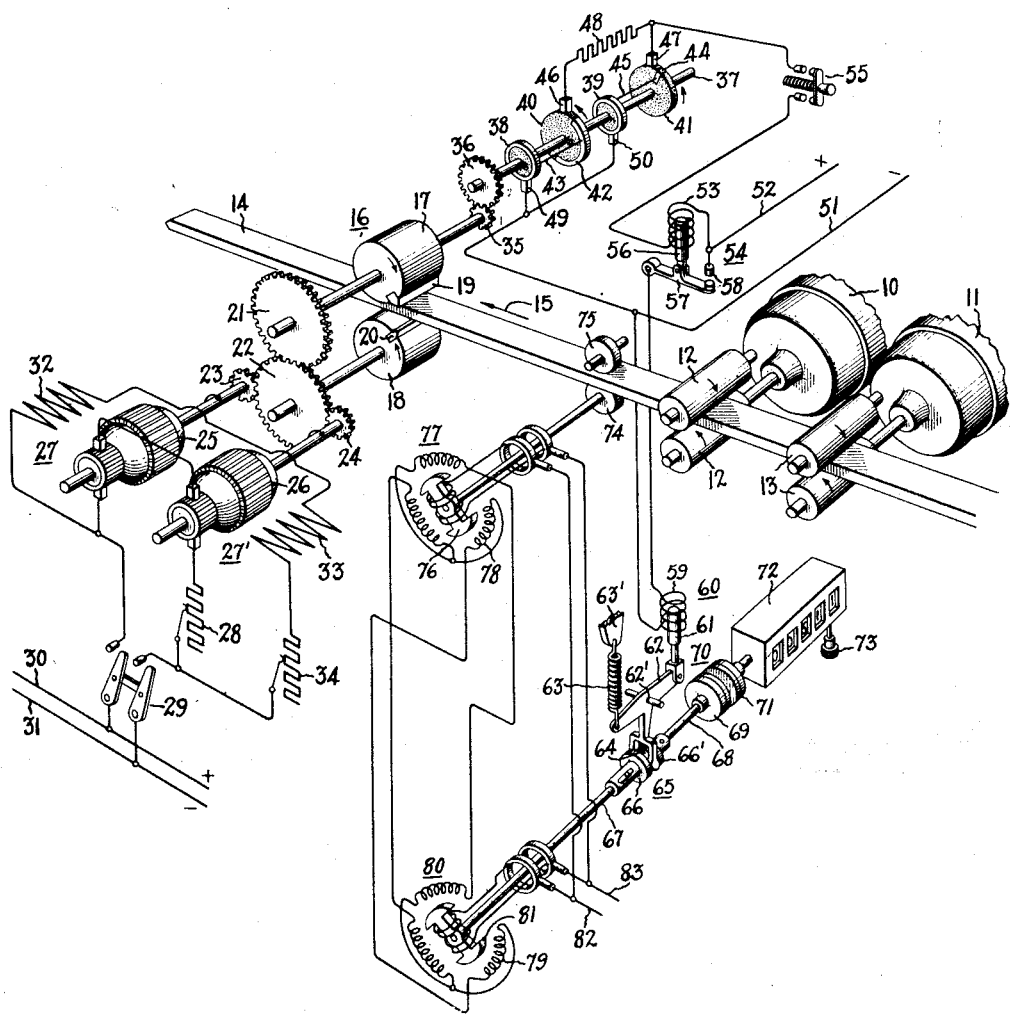
Inventor:
Leonid A. Umansky,
by Charles E. Mullen
His Attorney.

Patented Feb. 13, 1934

1,947,399

UNITED STATES PATENT OFFICE 1,947,399

LENGTH MEASURING INDICATOR

Leonid A. Umansky, Schenectady, N. Y., assignor to General Electric Company, a corporation of New York Application October 30, 1930. Serial No. 492,249

9 Claims. (Cl. 33—130)

My invention relates to an electrically actuated indicator for measuring the length between any two points on a strip of material.

In industry there are many instances where a strip of moving material has certain operations performed at separated places thereon and in many cases it is desirable to obtain accurate indications of the length of the material between any two of those separated places without using conventional measuring means. One of these instances is in the steel industry where a rotary flying shear cuts a moving strip of hot metal into lengths as the metal comes from the rolling mills. The hot metal can not be conveniently measured for length by a tape or other conventional measuring means immediately after it is cut. The length of the cut metal depends on the ratio between the speed of the metal and the speed of the flying shear, and in his endeavor to obtain the desired lengths of cut metal the operator calculates the speed of the metal from the known speed of the rolling mill motor, calculates the necessary speed of the flying shear to give the desired lengths and adjusts the speed of the flying shear to the calculated speed. These calculations consume an appreciable amount of time and interfere with operations, especially when rolling schedules are changed. It is obvious that if this disadvantage is removed by having the operator consult a precalculated table showing the relation between the rolling mill speeds, flying shear speeds, and lengths of metal cut, there still remains the disadvantage that it is very inconvenient, if not almost impossible, to actually measure the hot lengths immediately after they are cut by conventional measuring means. A considerable number of lengths will be cut before the metal is sufficiently cool to measure by conventional measuring means, and in most cases the operator supervising the cutting of the metal is unable to actually measure the lengths by conventional means when they are sufficiently cool because almost immediately after the lengths are cut they are forwarded to other places for further operations. In addition, the calculated length of the metal cut may easily vary 3% or more from its actual length because each of the calculations used for determining the calculated length may easily err 1% or more. The operator therefore usually endeavors to avoid making short lengths by adjusting the speed of the shears to cut the lengths several inches longer than required, thus resulting in an appreciable percentage of scrap metal in the finishing department. It is therefore desirable to provide an indicator giving a highly accurate measurement of the length cut at the instant the cut is made so that if any error in the length exists it can be quickly remedied before other erroneous cuts are made. This result is accomplished by my invention which consists of a cyclometer which is started at substantially the instant of one cut by the flying shear and stopped at substantially the instant of another cut by the flying shear, the cyclometer rotating at a speed which is substantially directly proportional to the speed of the moving metal and being calibrated to indicate directly in feet and inches the length cut.

My invention will however be best understood from the following description when considered in connection with the accompanying drawing which represents a preferred embodiment of my invention as applied to a rotary flying shear cutting lengths from a strip of moving metal, while those features of my invention which are believed to be novel and patentable will be pointed out in the appended claims.

In the preferred form of my invention I represent a conventional form of rolling mill and rotary flying shear for cutting the moving metal into suitable lengths. A cyclometer is driven through an electromagnetically operated clutch and a well known form of electrical means is preferably used to drive the clutch at a speed that is substantially directly proportional to the speed of the moving metal. Electromagnetic means responsive to successive operations of the flying shear on the moving metal are preferably used to control the electromagnetically operated clutch for starting the cyclometer at one operation of the shear and stopping the cyclometer at the next operation of the shear.

In the drawing, 10 and 11 represent motors driving the rolls 12 and 13 respectively in the directions shown by their adjacent arrows. The rolls 12 and 13 roll the metal 14 into the desired shape and also cause the metal to move in the direction shown by the arrow 15. The rotary flying shear 16 consists of the drums 17 and 18 rotating in the directions shown by their adjacent arrows and carrying the knives 19 and 20 respectively. The peripheries of the drums 17 and 18 do not touch the metal 14 and the knives 19 and 20 are arranged to start cutting the metal 14 at substantially the same time with each knife cutting through one-half of the metal. The drums 17 and 18 are driven by the gears 21 and 22 respectively, these gears having the same number of teeth. The gear 22 is driven by the gears 23 and 24 which have the same number of teeth and are driven by the armatures 25 and 26 respectively of the direct current motors 27 and 27'. The armatures 25 and 26 rotate in the directions shown by their adjacent arrows and are electrically connected in series with each other and in series with the adjustable starting resistance 28 and the switch 29 to the direct current lines 30 and 31. The motors 27 and 27' have field windings 32 and 33 respectively which are connected in series with each other and in series with the adjustable speed controlling resistance 34 and the switch 29 to the lines 30 and 31. The drum 17 drives the gear 35 which drives a gear 36 having twice as many teeth as the gear 35. The gear 36 drives a shaft 37 on which are placed the collector rings 38 and 39 and the insulated discs 40 and 41, the direction of rotation being shown by the arrows adjacent the discs 40 and 41. The disc 40 has a relatively long metallic contact segment represented by 42 which covers nearly 180 degrees of the disc periphery and which is electrically connected to the ring 38 by the lead 43. The disc 41 has a relatively short metallic contact segment represented by 44 which covers 1 degree or less of the disc periphery and which is electrically connected to the ring 39 by the lead 45. Stationary brushes 46 and 47 are adapted to rub on the discs 40 and 41 respectively and across the brushes 46 and 47 is connected a resistance 48. Two stationary brushes 49 and 50 rub on the rings 38 and 39 respectively. The brushes 49 and 50 are connected to the line 51 of a direct current source whose other line 52 is connected to one end of a solenoid coil 53 of an electromagnet 54. The other end of the coil 53 is connected in series with a push button switch 55 to the brush 47. The electromagnet 54 has a solenoid plunger 56 pivoted to a movable contact 57 adapted to make contact with a stationary contact 58 when the plunger 56 is pulled toward the center of the coil 53. The stationary contact 58 is connected to the line 52 and the movable contact 57 is connected to one end of the solenoid coil 59 of an electromagnet 60, the other end of this coil being connected to the line 51 and thus the contacts 57 and 58 act as the contactor for the electromagnet 60. The electromagnet 60 has a solenoid plunger 61 pivoted to one arm of a T-shaped member 62 which is pivoted at 62'. A spring 63 has one end connected to a stationary point 63' and the other end connected to the opposite arm of member 62. The remaining arm of the member 62 slides in the groove 64 of a coupling 65 having two main body parts 66 and 66'. The coupling part 66 is adapted to slide on a splined shaft 67 and the coupling part 66' is firmly secured to a shaft 68 driving 69 which represents one member of a clutch 70 whose other member 71 drives the cyclometer 72. The cyclometer has a knob 73 for resetting to give zero indications on its dials. Any type of suitable indicating or integrating device may be substituted for the cyclometer 72. The clutch 70 is represented with its members separated so that 72 will not register the movement of the metal 14.

In contact with the metal 14 is a roller 74 made of suitable material to resist wear and to roll on 14 without slippage. When there is a possibility of loss of contact between 14 and 74 due to irregularities in the contact surface of 14 any means may be employed to retain contact between 14 and 74, one of the means that may be employed being represented by the roller 75 which is sufficiently heavy to exert sufficient pressure on 14 to retain it in contact with 74. Any means may be employed for driving the shaft 67 at a speed which is substantially directly proportional to the speed of the roller 74, but I prefer to use the following well known form of electrical driving means for accomplishing this result. The roller 74 drives the wound rotor 76 of an alternating current generator 77 having a three-phase, Y-connected stator winding 78 whose free ends are connected to the free ends of a similar three-phase, Y-connected stator winding 79 of an alternating current motor 80 having a wound rotor 81 secured to the shaft 67. The rotors 76 and 81 have the same number of poles, are similar in construction and their windings are connected to a source of alternating current represented by the lines 82 and 83.

A description of the operation of my invention follows: Assume that the motors 10, 11, 27 and 27' are running, the metal 14 moving in the direction shown by the arrow 15 and no slippage between 74 and 14. The peripheral speed of 74 will be the same as the speed of 14 and therefore there will be a definite ratio between the revolutions per minute of the rotor 76 and the speed in feet per minute of 14. Assuming that the rotors 76 and 81 are energized with alternating current from lines 82 and 83, each rotor induces voltages in the three phases of its associated stator winding, the voltages in each stator winding being unequal in magnitude and varying with the position of the rotor. If the voltages induced in the stator winding 79 are not equal and opposite to the voltages induced in the stator winding 78, a current will circulate between the stator windings which will produce torques that tend to bring the rotors to the positions where the induced voltages in winding 79 are equal and opposite to the induced voltage in winding 78. The rotor 76 is held in position and rotated by the roller 74, thus constantly varying the induced voltages in winding 78. The rotor 81 being free to move first assumes a position where the induced voltages in 79 are opposite to but slightly less than the induced voltages in 78, this difference in voltage being that necessary to circulate the current through 79 to give a torque to rotate 81, and since this torque is constant it follows that once the difference in induced voltages has been established the two rotors will rotate at the same number of revolutions per minute. During movement of the metal 14 the two rotors are in continuous rotation and it follows that there will be a definite ratio between the speed in feet per minute of 14 and the number of revolutions per minute of the clutch member 69. When the coil 59 of the electromagnet 60 is not energized the spring 63 produces a sufficient bias to keep the clutch members 69 and 71 separated, thus preventing operation of the cyclometer 72. When the coil 59 is energized the plunger 61 is pulled up with sufficient force to overcome the bias of the spring 63, slide the coupling part 66 on the shaft 67 to cause engagement of the clutch members 69 and 71 and start operation of 72. It is obvious that there will be a definite and known ratio between the revolutions per minute at which the clutch member 71 rotates the internal mechanism of 72 and the speed in feet per minute of the metal 14. The distance traveled by 14 during a given interval of time can be readily ascertained by multiplying that ratio by the difference between the indications of 72 at the beginning and end of that interval. It is usually preferable however to calibrate 72 so that it directly indicates the distance traveled by 14, so that the numbers shown for example on the dials of 72 would mean that 14 has traveled 5 feet, 11 inches past a given point during a given interval of time and to simplify the remainder of the explanation I will assume that the cyclometer 72 is so calibrated. If desired the rotor 76 may be driven by one of the rolls 12 or from the other end of the motor 10 since the speeds of 10 and 12 are substantially directly proportional to the speed of 14.

Since the gear 36 has twice as many teeth as the gear 35 the discs 40 and 41 make one-half a revolution for every revolution made by the knives 19 and 20. The contact segment 44 is so placed that it makes contact with the brush 47 at substantially the instant the knives 19 and 20 complete the cutting off of a length from 14. The length of 44 is such that it maintains contact with 47 for a time interval that is much shorter than that required by the knives 19 and 20 to make another revolution and cut the next length from 14. The contact segment 42 is so placed that it makes contact with the brush 46 after the segment 44 has made contact with brush 47 but during the interval that 44 is in contact with 47. The length of 42 is such that it breaks contact with 46 at substantially the instant that the knives 19 and 20 have made another revolution and completed the cutting off of another length from 14. To obtain an indication on 72 of the length of the piece cut from 14 by the knives 19 and 20, the operator preferably turns the knob 73 till the dials indicate zero and closes the switch 55. Assuming that at the instant 55 is closed the contact segments 42 and 44 are in the positions shown on the drawing, it will be obvious that when the knives 19 and 20 have completed the cutting off of a length from 14 the contact segment 44 will have rotated to make contact with 47 and the coil 53 of electromagnet 54 will be connected directly to the lines 51 and 52, the circuit being from line 51, brush 50, collector ring 39, lead 45, contact segment 44, brush 47, switch 55 and coil 53 to line 52. The coil 53 will become sufficiently energized to pull 57 into contact with 58, thus connecting coil 59 to the lines 51 and 52, and the energizing of coil 59 pulls the plunger 61 upward and starts operation of the cyclometer 72 at substantially the instant the knives 19 and 20 have completed the cutting off of a length from 14. The rotation of drums 17 and 18 to cut off the next length from 14 rotates contact segments 42 and 44 and when 44 breaks contact with 47 the contact is already made between 42 and 46 and the coil 53 will be connected in series with the resistance 48 to the lines 51 and 52, the circuit being from line 51, brush 49, collector ring, 38, lead 43, contact segment 42, brush 46, resistance 48, switch 55 and coil 53 to line 52. The resistance 48 is of such value that the current in 53 produces a sufficient pull on 56 to maintain 57 in contact with 58 after they are already in contact but would not produce a sufficient pull on 56 to bring 57 into contact with 58 if they are separated, the reason for this being described later. The contact 57 therefore remains in contact with 58 during the interval 42 is in contact with 46, thus keeping 59 energized and retaining operation of 72. At substantially the instant the knives 19 and 20 have made one revolution and completed the cutting off of another length from 14, the contact between 42 and 46 is broken, thus causing 53 to become deenergized and 57 to break contact with 58, whereupon 59 becomes deenergized, hence allowing 63 to reassert its bias and stop operation of 72. When the operator notices that 72 has stopped registering he will open switch 55. The dials on 72 will now indicate the length of 14 cut off by the knives 19 and 20 since this length must be the same as the length of 14 passing over 74 during the operation of 72. By reading the numbers on the dials of 72 the operator determines the length cut off immediately after the cut is completed and if the length cut off differs from the required length he can quickly change the speed of the motors 27 and 27' in the proper direction by adjusting rheostat 34 and after three or four speed adjustments followed by checks on 72 he should have the cuts made to give the required lengths. The operator can now make periodic checks of the lengths cut off, thus enabling him to make adjustments when necessary to prevent short lengths or scrap metal which must be cut off from long lengths. It is obvious that if the operator happens to close the switch 55 after the contact segment 44 has passed the brush 47, the cyclometer 72 can not start operation even if there is contact between 42 and 46 because due to the resistance 48 being in series with the coil 53 the current in the coil 53 is insufficient to produce a pull on 56 to bring 57 into contact with 58, thus preventing erroneous indications of 72. The cyclometer 72 will start operation only when 44 makes contact with 47 and cease operation when 42 breaks contact with 46. The maximum possible indicating error of 72 can occur only in the exceptional case when switch 55 is closed at the instant 44 is ready to break contact with 47, thus giving an error represented by the fraction of the periphery of 41 that is covered by 44. This fraction is 1/360 or less than ⅓ of 1%, which is sufficiently accurate for all purposes. It will be obvious that in the vast majority of the checks of lengths cut the indications will be free of even the small error described because only in one check out of 360 can it occur that the operator will close the switch 55 when contact segment 44 is ready to break contact with brush 47. The invention has been tested under actual conditions as described and has given very satisfactory operation.

It is obvious that if the arrangement of the apparatus is such as to permit the discs 40 and 41 to rotate at comparatively slow speed and to be within close observation of the operator, then 39, 50, 45, 41, 44, 47 and 48 may be eliminated, the lead secured to 47 may be secured to 46 and the contact segment 42 lengthened so that it makes contact with 46 at substantially the instant the knives 19 and 20 complete the cutting off of a length from 14. The operator now observes the disc 40 and closes 55 before 42 makes contact with 46 and opens 55 after 42 breaks contact with 46 but before it again makes contact with 46. The cyclometer 72 will then indicate the length cut off without the possible indicating error previously described. Where the arrangement of the apparatus does not permit the discs to be within close observation of the operator or when the discs rotate too fast for close observation as to the making and breaking of contact between 42 and 46 then the arrangement shown in the drawing is to be preferred.

I have described my invention in connection with a rolling mill where the metal moves and is cut into lengths by a rotary flying shear having angular motion only, but it should be obvious that my invention may be used with any relatively movable mechanism and a strip of material, the mechanism being adapted to perform desired operations on the material at separated places thereon, and where it is desired to indicate the length of the material between any two of the separated places. I therefore wish it understood that the embodiment represented is merely illustrative of the principles of my invention and that all modifications falling within its true spirit and scope are intended to be included within the scope of the appended claims.

What I claim as new and desire to secure by Letters Patent of the United States, is:

1. The combination with a machine provided with mechanism for intermittently performing an operation on a strip of material and with means for producing a relative movement between the strip and the mechanism, of an indicator, driving means for operating said indicator, means for actuating said driving means at a speed which is substantially directly proportional to the rate of the relative movement between the strip and said mechanism, a clutch between said driving means and said indicator, the said clutch consisting of two separable members, biasing means for normally retaining said clutch members disengaged, means including electroresponsive means for overcoming the effect of said biasing means and for causing engagement of said clutch members, a source of current, and means responsive to the operation of said mechanism for connecting said electroresponsive means to said source at substantially the instant of occurence of an operation on the strip and for disconnecting said electroresponsive means from said source at substantially the instant of occurrence of another operation on the strip.

2. The combination with a machine provided with mechanism for intermittently performing an operation on a strip of material and with means for producing a relative movement between the strip and the mechanism, of an indicator, driving means for operating said indicator, means for actuating said driving means at a speed which is substantially directly proportional to the rate of the relative movement between the strip and said mechanism, a clutch between said driving means and said indicator, the said clutch consisting of two separable members, biasing means for normally retaining said clutch members disengaged, means including an electromagnet for overcoming the effect of said biasing means and for causing engagement of said clutch members, a source of current, a circuit including normally open contacts for connecting said electromagnet to said source, electroresponsive means for closing said contacts, and means responsive to the operation of said mechanism for connecting said electroresponsive means to said source during the time interval elapsing between two of said operations.

3. The combination with a machine provided with mechanism for intermittently performing an operation on a strip of material and with means for producing a relative movement between the strip and the mechanism, of an indicator, driving means for operating said indicator, means for actuating said driving means at a speed which is substantially directly proportional to the rate of the relative movement between the strip and said mechanism, a clutch between said driving means and said indicator, the said clutch consisting of two separable members, biasing means for normally retaining said clutch members disengaged, means including an electromagnet for overcoming the effect of said biasing means and for causing engagement of said clutch members, a source of current, a circuit including normally open contacts for connecting said electromagnet to said source, electroresponsive means for closing said contacts, a rotatable contact segment, a stationary contact cooperating with said contact segment, means for rotating said contact segment at a speed which is substantially directly proportional to the rate of operations performed by said mechanism on the strip of material, and connecting means including said rotatable contact segment and its cooperating stationary contact for connecting said electroresponsive means to said source, said rotatable contact segment and its cooperating stationary contact being suitably positioned to make contact with each other during a time interval substantially equal to that elapsing between two operations performed by said mechanism on the strip of material.

4. The combination with a machine provided with mechanism for intermittently performing an operation on a strip of material and with means for producing a relative movement between the strip and the mechanism, of an indicator, driving means for operating said indicator, means for actuating said driving means at a speed which is substantially directly proportional to the rate of the relative movement between the strip and said mechanism, a clutch between said driving means and said indicator, the said clutch consisting of two separable members, biasing means for normally retaining said clutch members disengaged, means including an electromagnet for overcoming the effect of said biasing means and for causing engagement of said clutch members, a source of current, a circuit including normally open contacts for connecting said electromagnet to said source, electroresponsive means for closing said contacts, two rotatable contact segments, two stationary contacts respectively cooperating with said contact segments, means for rotating said contact segments at a speed which is substantially directly proportional to the rate of operations performed by said mechanism on the strip of material, and connecting means including said rotatable contact segments and their cooperating stationary contacts for connecting and disconnecting said electroresponsive means to and from said source, one of said rotatable contact segments and its cooperating stationary contact being suitably positioned to connect said electroresponsive means to said source at substantially the instant of occurrence of an operation on the strip of material, and the other of said rotatable contact segments and its cooperating stationary contact being suitably positioned to disconnect said electroresponsive means from said source at substantially the instant of occurrence of another operation on the strip of material.

5. A device for measuring the distance between two spaced apart points on a strip at which operations are performed by apparatus provided with a mechanism for intermittently performing an operation on the strip and with means for producing a relative movement between the strip and the mechanism, said device comprising an indicator, two separate engageable driving members for operating said indicator, one of said driving members being mounted on said indicator, means for actuating the other of said driving members at a speed which is substantially directly proportional to the rate of the relative movement between said strip and said mechanism, biasing means for normally maintaining said driving members in a disengaged condition, power operated means for overcoming the effect of said biasing means and for effecting engagement of said driving members, and means responsive to the operation of said mechanism for making said power operated means effective at substantially the instant one operation is completed by said mechanism on said strip and for making said power operated means ineffective at substantially the instant a subsequent operation is completed by said mechanism on said strip.

6. A device for measuring the distance between two spaced apart points on a strip at which operations are performed by apparatus provided with a mechanism for intermittently performing an operation on the strip and with means for producing a relative movement between the strip and the mechanism, said device comprising an indicator, two separate engageable driving members for operating said indicator, one of said driving members being mounted on said indicator, means for actuating the other of said driving members at a speed which is subtantially directly proportional to the rate of the relative movement between said strip and said mechanism, biasing means for normally maintaining said driving members in a disengaged condition, power operated means for overcoming the effect of said biasing means and for effecting engagement of said driving members, and means responsive to the operation of said mechanism for effecting the operation of said power operated means during a period which is substantially equal to that elapsing between two successive operations performed by said mechanism on said strip.

7. A device for measuring the distance between two spaced apart points on a strip at which operations are performed by apparatus provided with a mechanism for intermittently performing an operation on the strip and with means for producing a relative movement between the strip and the mechanism, said device comprising an indicator, a clutch for operating said indicator, said clutch consisting of two separable members, one of said clutch members being mounted on said indicator, means for driving the other of said clutch members at a speed which is substantially directly proportional to the rate of the relative movement between said strip and said mechanism, biasing means for normally maintaining said clutch members in a disengaged condition, electroresponsive means for overcoming the effect of said biasing means and for effecting engagement of said clutch members, and means responsive to the operation of said mechanism for effecting the energization of said electroresponsive means during a period which is substantially equal to that elapsing between two successive operations performed by said mechanism on said strip.

8. A device for measuring the distance between two spaced apart points on a strip at which operations are performed by an apparatus provided with a mechanism for intermittently performing an operation on the strip and with means for producing a relative movement between the strip and the mechanism, said device comprising an indicator, driving means for operating said indicator, means for operating said driving means at a speed which is substantially directly proportional to the rate of relative movement between the mechanism and strip, a clutch between said driving means and said indicator, said clutch having two separable members, biasing means for normally retaining said clutch members disengaged, means including an electromagnet for overcoming the effect of said biasing means and for effecting engagement of said clutch members, electroresponsive means for effecting the energization of said electromagnet, two rotatable contact segments, means for rotating said contact segments at a speed which is substantially directly proportional to the rate at which said mechanism performs the operations on said strip, two stationary contacts respectively cooperating with said rotatable contact segments, and a circuit including said rotatable contact segments and their cooperating stationary contacts for energizing said electroresponsive means from a source of current, one of said rotating contact segments being adapted to establish a connection which effects the energization of said electroresponsive means at substantially the instant one operation is performed on said strip and to open this connection at the end of a period that is shorter than that elapsing between two operations on said strip, and the other rotating contact segment being adapted to establish during said period a connection which maintains the energization of said electroresponsive means after the end of said period and to open the last mentioned connection for effecting the deenergization of said electroresponsive means at substantially the instant another operation is performed on said strip.

9. A device for measuring the distance between two spaced apart points on a strip at which operations are performed by an apparatus provided with a mechanism for intermittently performing an operation on the strip and with means for producing a relative movement between the strip and the mechanism, said device comprising an indicator, driving means for operating said indicator, means for operating said driving means at a speed which is substantially directly proportional to the rate of relative movement between the mechanism and the strip, a clutch between said driving means and said indicator, said clutch having two separable members, biasing means for normally retaining said clutch members disengaged, means including an electromagnet for overcoming the effect of said biasing means and for effecting engagement of said clutch members, electroresponsive means for effecting the energization of said electromagnet, relatively long and short rotating contact segments, means for rotating said contact segments at a speed which is substantially directly proportional to the rate at which said mechanism performs the operations on said strip, two stationary brushes, said relatively short rotating contact segment being adapted to make contact with one of said brushes at substantially the instant one operation is performed on said strip and to break this contact at the end of a period that is shorter than that elapsing between two operations on said strip, and said relatively long rotating contact segment being adapted to make contact with the other of said brushes during said period and to break this contact at substantially the instant another operation is performed on said strip, a resistance connected across said brushes, and means for connecting said electroresponsive means directly to a source of current when the relatively short rotating contact segment is in contact with its brush, and for connecting said electroresponsive means in series with said resistance to said source when the relatively long rotating contact segment is in contact with its brush.

LEONID A. UMANSKY.